United States Patent
Plattner et al.

(10) Patent No.: US 12,426,533 B2
(45) Date of Patent: Sep. 30, 2025

(54) SEED TABS FOR PLANTERS

(71) Applicant: Precision Planting LLC, Tremont, IL (US)

(72) Inventors: Chad E. Plattner, Tremont, IL (US); David Colson, Peoria, IL (US)

(73) Assignee: Precision Planting LLC, Tremont, IL (US)

( * ) Notice: Subject to any disclaimer, the term of this patent is extended or adjusted under 35 U.S.C. 154(b) by 715 days.

(21) Appl. No.: 17/756,762

(22) PCT Filed: Aug. 14, 2020

(86) PCT No.: PCT/IB2020/057679
§ 371 (c)(1),
(2) Date: Jun. 1, 2022

(87) PCT Pub. No.: WO2021/111198
PCT Pub. Date: Jun. 10, 2021

(65) Prior Publication Data
US 2023/0000006 A1    Jan. 5, 2023

Related U.S. Application Data

(60) Provisional application No. 62/942,909, filed on Dec. 3, 2019.

(51) Int. Cl.
*A01C 7/20*          (2006.01)
(52) U.S. Cl.
CPC ..................................... *A01C 7/20* (2013.01)
(58) Field of Classification Search
CPC ..................................... A01C 7/20; A01C 7/00
See application file for complete search history.

(56) References Cited

U.S. PATENT DOCUMENTS

| | | | |
|---|---|---|---|
| 5,425,318 A | 6/1995 | Keeton | |
| 5,673,638 A | 10/1997 | Keeton | |
| 5,918,557 A | 7/1999 | Schaffert | |
| 6,082,275 A | 7/2000 | Schaffert | |

(Continued)

FOREIGN PATENT DOCUMENTS

| | | |
|---|---|---|
| AU | 2013399168 B2 | 9/2017 |
| EP | 3269221 A1 | 1/2018 |
| WO | 2001/076352 A1 | 10/2001 |

OTHER PUBLICATIONS

Instituto Nacional De La Propiedad Industrial, Search Report for related PCT Application No. AR120642A1, dated Nov. 5, 2024, 14 pages including translation.

(Continued)

*Primary Examiner* — Christopher J. Novosad

(57) ABSTRACT

A seed tab for a planter has an elongate body configured for attachment to a seed boot of a seed meter. The elongate body has a curved surface defining a first arc having an axis of curvature in a first direction. The curved surface exhibits a concave cross-section defining a second arc having an axis of curvature in a second direction generally perpendicular to the first direction. The elongate body has a first portion having an approximately constant width adjacent the first end. The elongate body has a second portion having a tapered width adjacent the second end. A maximum width of the second portion is greater than the constant width of the first portion. Seeding machines have seeder row units with such seed tabs.

19 Claims, 5 Drawing Sheets

(56) References Cited

U.S. PATENT DOCUMENTS

| | | |
|---|---|---|
| 6,209,466 B1 | 4/2001 | Wodrich |
| 6,666,156 B1 | 12/2003 | Mayerle et al. |
| 7,168,376 B2 | 1/2007 | Johnston |
| 7,856,934 B2 | 12/2010 | Hagny |
| 9,155,244 B2 | 10/2015 | Schaffert |
| 9,374,942 B2 | 6/2016 | Schaffert |
| 9,402,341 B1 | 8/2016 | Wipf |
| 9,668,402 B2 | 6/2017 | Hagny |
| 9,686,908 B2 | 6/2017 | Mead et al. |
| 9,723,777 B2 | 8/2017 | Schaffert |
| 9,736,978 B2 | 8/2017 | Schaffert |
| 9,877,425 B2 | 1/2018 | Garner et al. |
| 10,091,927 B2 | 10/2018 | Garner et al. |
| 11,653,591 B2 | 5/2023 | McMahon et al. |
| 2004/0255834 A1 | 12/2004 | Schaffert |
| 2005/0263053 A1 | 12/2005 | Schaffert |
| 2009/0235853 A1 | 9/2009 | Schaffert |
| 2016/0192582 A1 | 7/2016 | Hagny |
| 2016/0295792 A1 | 10/2016 | Secrest et al. |
| 2018/0124993 A1 | 5/2018 | Schaefer et al. |
| 2018/0153094 A1 | 6/2018 | Redtke et al. |
| 2019/0037763 A1 | 2/2019 | Martin |
| 2019/0239419 A1 | 8/2019 | Sauder et al. |

OTHER PUBLICATIONS

UK Intellectual Property Office, Search report for related UK Application No. GB2000172.3, dated Jul. 6, 2020.
European Patent Office, International Search Report related to International Patent Application No. PCT/IB2020/057679, mail date Dec. 15, 2020.

SEED TABS FOR PLANTERS

CROSS-REFERENCE TO RELATED APPLICATION

This application claims the benefit of the filing date of U.S. Provisional Patent Application 62/942,909, "Seed Tabs for Planters," filed Dec. 3, 2019, the entire disclosure of which is incorporated herein by reference.

FIELD

This disclosure relates to row units used on agricultural vehicles for planting an agricultural crop, and more particularly to seed-delivery systems associated with seed meters.

BACKGROUND

Crop yields are affected by a variety of factors, such as seed placement, soil quality, weather, irrigation, and nutrient applications. Seeds are typically planted in trenches formed by discs or other mechanisms of a planter row unit. Seed-delivery systems, in particular ones that deliver the seed from the meter to the trench with air, can convey the seed with high enough velocity that some seeds bounce out of the trench. A seed that has bounced out, lying on top of the ground, has a high risk of not germinating.

BRIEF SUMMARY

In some embodiments, a seed tab for a planter has an elongate body configured for attachment to a seed boot of a seed meter. The elongate body has a curved surface defining a first arc having an axis of curvature in a first direction. The curved surface exhibits a concave cross-section defining a second arc having an axis of curvature in a second direction generally perpendicular to the first direction. The elongate body has a first portion having an approximately constant width adjacent the first end. The elongate body has a second portion having a tapered width adjacent the second end. A maximum width of the second portion is greater than the constant width of the first portion.

A seeding machine includes a frame, a first seeder row unit coupled to the frame, and a second seeder row unit coupled to the frame. The first seeder row unit includes a first furrow opener, a first seed boot configured to deliver seed from the first seeder row unit to a first furrow formed by the first furrow opener, and a first seed tab comprising a first elongate body configured for attachment to the first seed boot. The second seeder row unit includes a second furrow opener, a second seed boot configured to deliver seed from the second seeder row unit to a second furrow formed by the second furrow opener, and a second seed tab comprising a second elongate body configured for attachment to the second seed boot. The first and second elongate bodies each have a curved surface defining a first arc having an axis of curvature in a first direction and a concave cross-section defining a second arc having an axis of curvature in a second direction generally perpendicular to the first direction. The first elongate body is a mirror image of the second elongate body.

BRIEF DESCRIPTION OF THE DRAWINGS

While the specification concludes with claims particularly pointing out and distinctly claiming what are regarded as embodiments of the present disclosure, various features and advantages of the disclosure may be more readily ascertained from the following description of example embodiments when read in conjunction with the accompanying drawings, in which:

DETAILED DESCRIPTION

Figure 1:
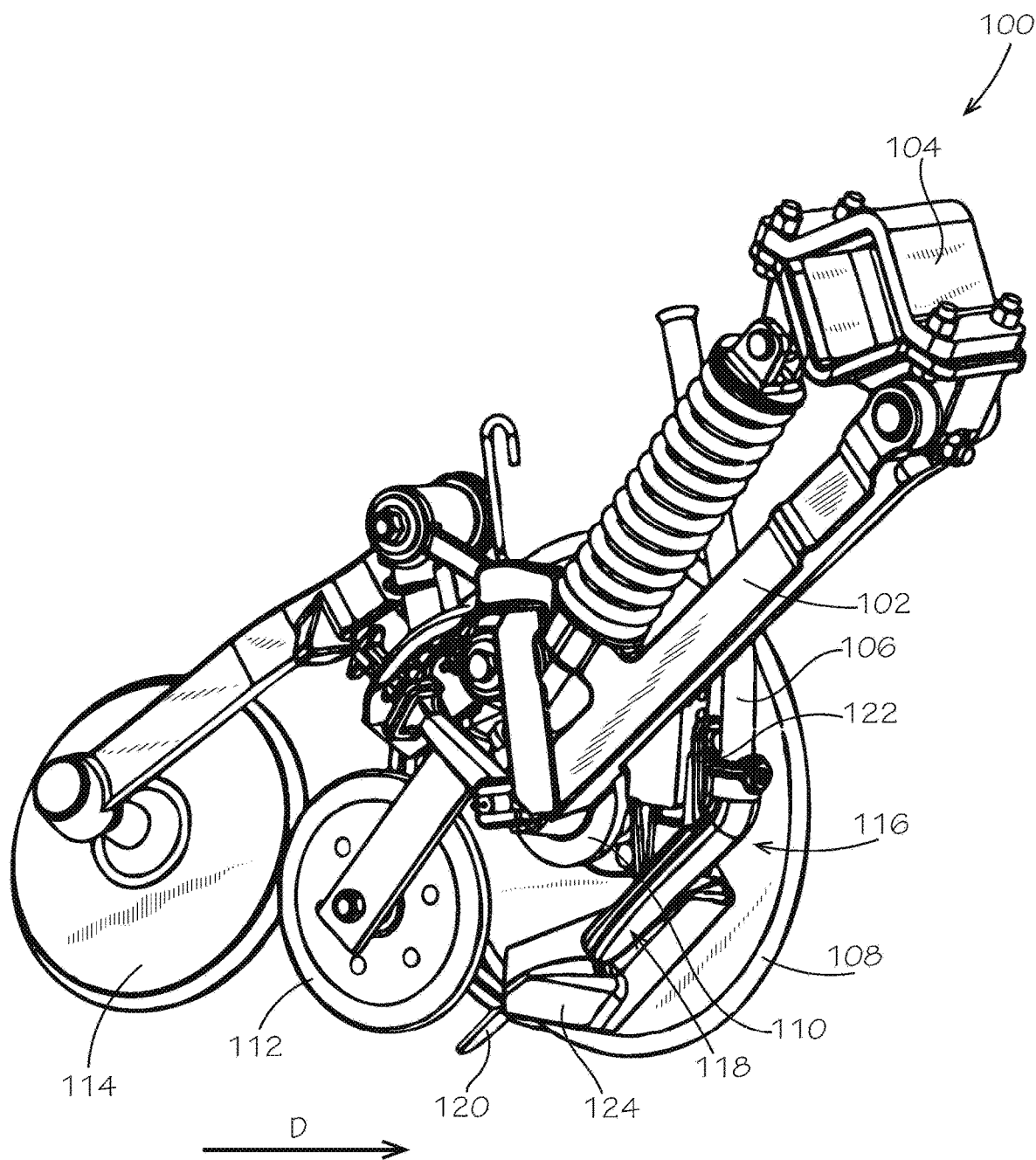
FIG. 1 is a simplified side view of a row unit for planting.

The illustrations presented herein are not actual views of any planter or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 is a simplified side view of a seeder row unit 100 for a seeding machine. The seeder row unit 100 has a frame 102 coupled to a frame of the seeding machine, such as by a bar clamp 104. Seeds are typically delivered to the seeder row unit 100 by gravity or pneumatically by a seed tube 106 that extends down from a lower part of the seeding machine. The seed tube 106 may be, for example, a plastic or metal tube. In another embodiment, the frame 102 may carry a seed meter assembly, which may include a mini-hopper holding seeds from a main seed hopper on the seeding machine or a commodity cart associated with the seeding machine.

The frame 102 carries furrow opener 108 configured to rotate relative to the frame 102 on a bearing assembly 110, which may be aligned with or angled with respect to the travel direction of the seeding machine. In the illustrated example, the furrow opener 108 is angled with respect to a travel direction D to form a generally V-shaped furrow when the furrow opener 108 cuts into the ground into which the seeds are deposited. A rotating seed press wheel 112 is mounted to the frame 102 behind the furrow opener 108 for pressing deposited seeds into the seed furrow. A rotating closing wheel 114 is mounted to the furrow opener 108 immediately behind the seed press wheel 112 to collapse the seed furrow and cover the deposited seeds with a loose layer of soil.

Seeds are directed from the seed tube 106 downwardly into a seed boot assembly 116 disposed along and to a rear side of the furrow opener 108. The seed boot assembly 116 includes a seed boot 118 and a seed tab 120. In some embodiments, the seed boot 118 may also include a boot liner (not shown), such as flexible tube or other liner material, that may couple directly to the seed tube 106, or indirectly via an adapter. In certain embodiments, the seed boot 118 may be a rigid assembled or monolithic component. The seed boot 118 may mount to the frame 102 in any suitable manner, for example, by an integrally formed mounting tab 122, a pivot bolt or pin, and/or a spring to bias the seed boot 118 into the furrow opener 108.

Figure 2:
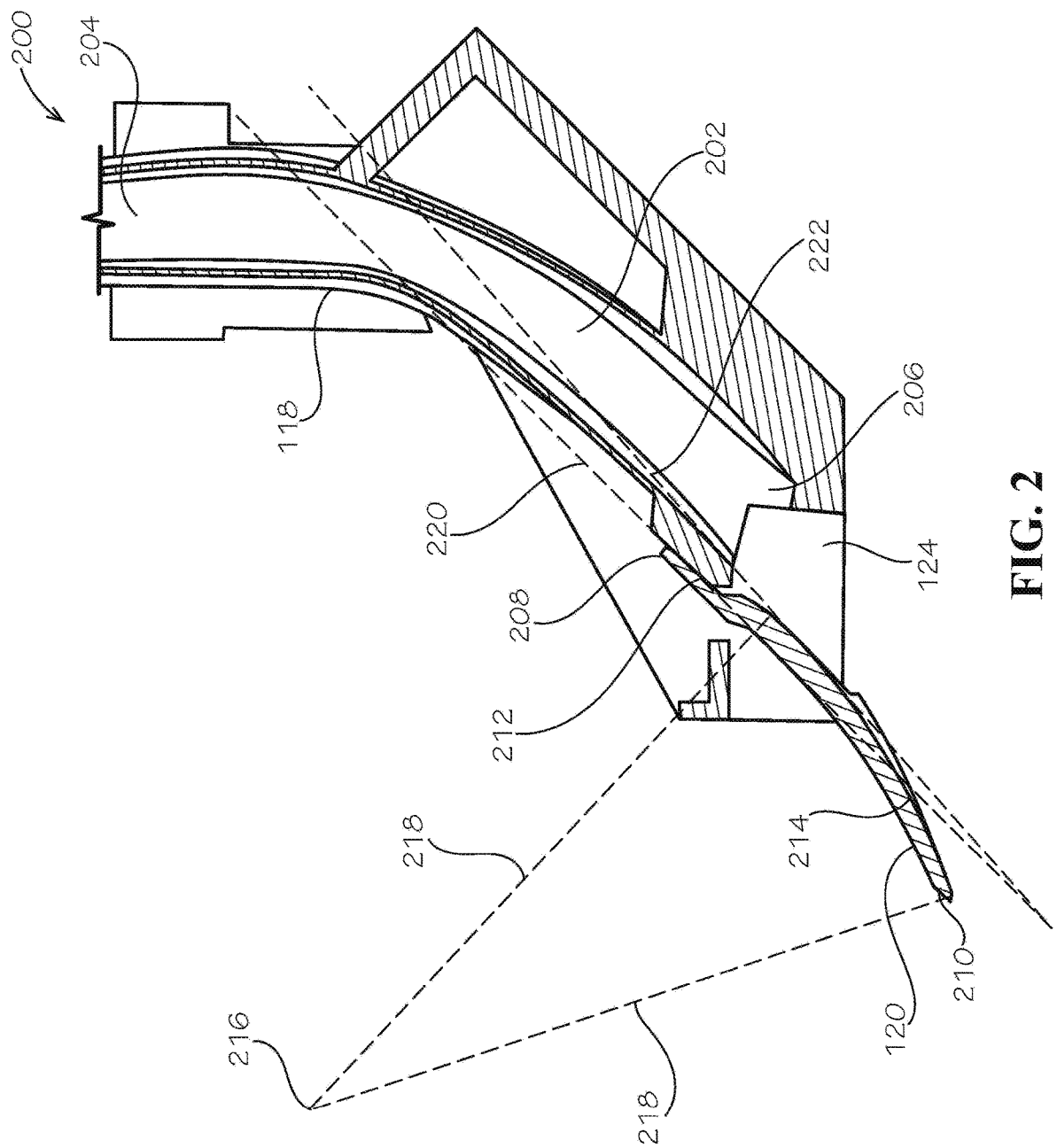
FIG. 2 is a simplified cross-sectional view of a seed-delivery mechanism including a seed tab.
Figure 3:
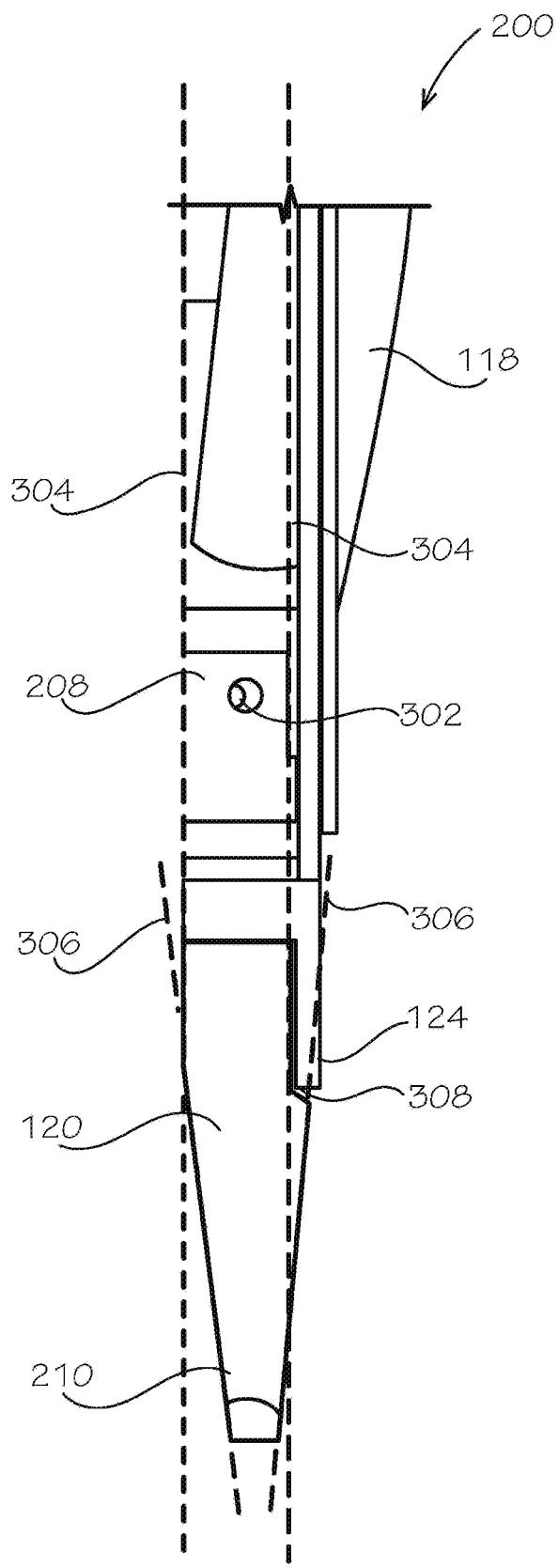
FIG. 3 is a simplified top view of the seed-delivery mechanism and seed tab shown in FIG. 2.
Figure 4:
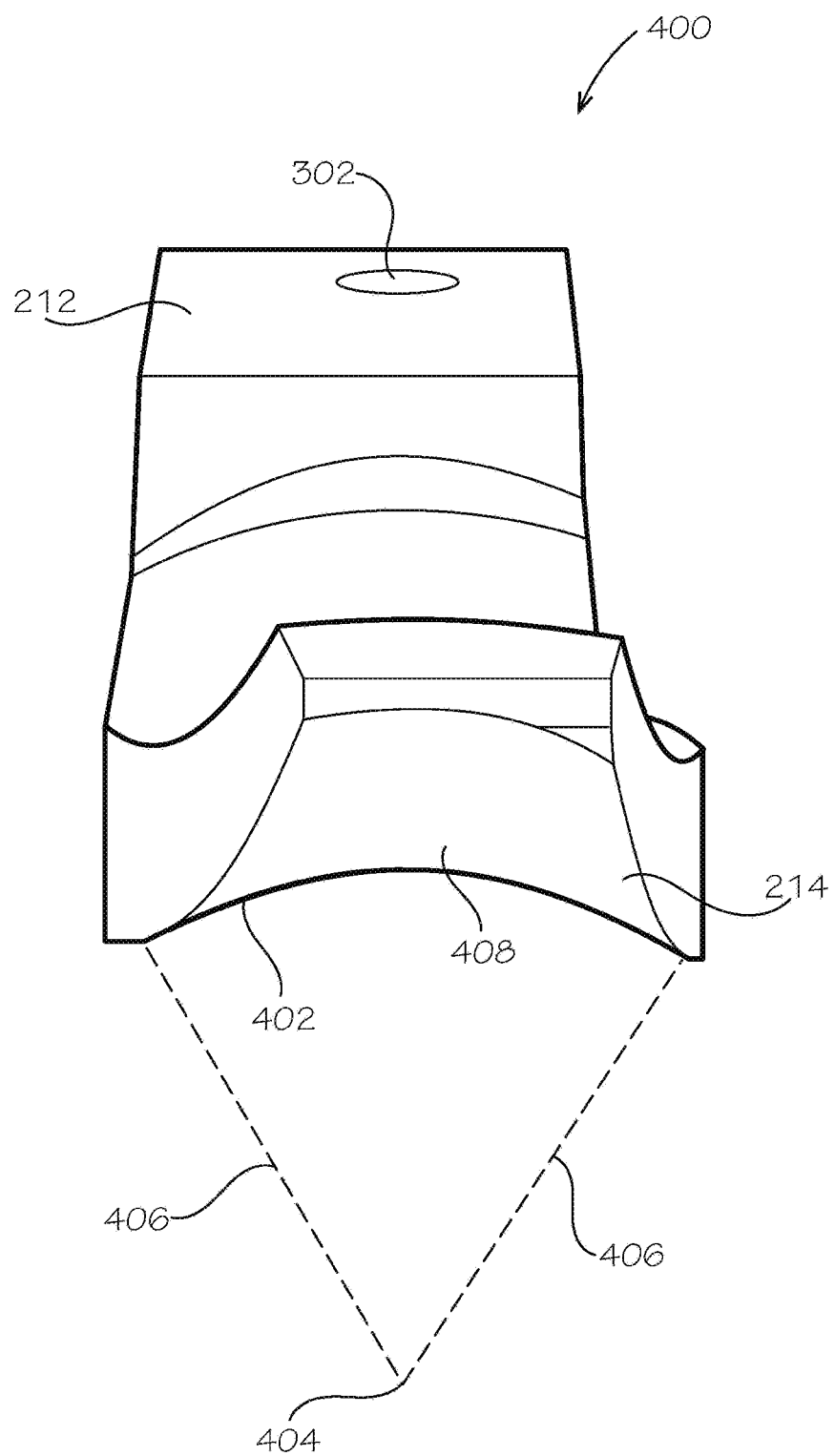
FIG. 4 is a simplified bottom rear view of the seed-delivery mechanism and seed tab shown in FIG. 2.

FIG. 2 is a simplified cross-sectional view of a seed-delivery mechanism 200 that includes a seed boot 118 and the seed tab 120 attached to the seed boot 118. FIG. 3 is a simplified top view of the seed tab 120 and a portion of the seed boot 118 to which the seed tab 120 is attached. FIG. 4 is a simplified view of the seed tab 120 from the bottom rear.

As depicted in FIG. 2, the seed boot 118 defines a seed passage 202 that has an inlet end 204 and an outlet end 206. The inlet end 204 is located in front of the mounting tab 122 and the bearing assembly 110, with respect to the travel direction D of the seeder row unit 100. The outlet end 206 is located below and behind the mounting tab 122 and the bearing assembly 110. An integrally formed vane 124 projects downward and rearward from the outlet end 206. The vane 124 forms a laterally outer side wall for the outlet end 206 of the seed boot 118. The furrow opener 108 is positioned close to the seed boot 118 and effectively forms a laterally inner side wall for the outlet end 206 of the seed boot 118.

In the illustrated example, the seed boot 118 follows a generally straight trajectory from a side perspective, extending downward and rearward at approximately 35-50 degrees, and in some cases about 45 degrees, from horizontal when mounted to the frame 102 as shown, depending on the depth and height setting of the frame 102 from the ground. The seed passage 202 may also have a generally straight, uniform cross-section between the inlet end 204 and the outlet end 206. Generally, however, the seed passage 202 is curved to provide adequate clearance between the seed boot 118 and the bearing assembly 110 of the furrow opener 108. In the illustrated example, the seed passage 202 has a contoured inner dimension that follows a slightly curved trajectory (e.g., in the laterally outward to inward direction) configured to help reduce side to side (i.e., lateral) seed bounce within the seed boot 118, or to otherwise effect seed bounce that causes the seeds to follow a trajectory that expels the seeds in straight lines directly behind the seed boot 118. This helps to reduce the number of seeds being deposited at locations other than at the bottom of the furrow (e.g., outside the furrow when the seed boot is running above the ground plane.) The seed passage 202 may have a generally circular cross-section at the inlet end 204 and a portion of its length, and have a non-circular cross-section through the remainder of its length and at the outlet end 206, transitioning smoothly from the generally circular cross-section to an oblong cross-section having a smaller lateral (sideways) dimension than its height dimension at the outlet end 206. The outer surface dimensions and configuration of the seed boot 118 may also vary. However, in the illustrated example, little or none of the seed boot 118 extends beyond the laterally inner side of the furrow opener, and the vane 124 may be positioned and configured to skim across the surface of the furrow wall opposite the furrow opener 108. This may reduce wearing of the seed boot 118 and aid in enclosing the seeds deposited from the seed boot 118, in part by reducing boot-to-soil contact that may tend to widen the top of the furrow inadvertently.

As described, the seed boot 118, including the vane 124, in combination with the furrow opener 108 and the furrow walls, operates to enclose or confine, or otherwise define, the volume in which seeds may be deposited from the seed boot 118. The seed tab 120 also helps to define this volume, and directs the seeds downward toward the bottom of the furrow.

As shown in FIG. 2, the seed tab 120 has an elongate body having a first end 208 coupled to the seed boot 118 and a second end 210 opposite the first end 208. At the first end 208, a generally planar surface 212 may couple the seed tab 120 to the seed boot 118 through a hole 302 (FIG. 3) defined through the generally planar surface 212, typically by a screw or other fastener. In other embodiments, the first end 208 may have another shape of surface to match a different shape of the seed boot 118.

The second end 210 has a curved surface 214 defining a first arc having an axis of curvature 216 in a first direction; that is, the axis of curvature 216 extends in a direction perpendicular to the paper in the view shown in FIG. 2. Therefore, the curved surface 214 has an arc having a radius of curvature 218 centered about the axis of curvature 216.

As depicted in FIG. 4, the curved surface 214 also exhibits a concave cross-section 402 defining a second arc with an axis of curvature 404 in a second direction generally perpendicular to the first direction. The concave cross-section 402 has a radius of curvature 406 centered about the axis of curvature 404.

Returning to FIG. 3, the seed tab 120 has a first portion having an approximately constant width adjacent the first end 208. That is, in the orientation shown in FIG. 3, the body of the seed tab 120 is bounded by parallel planes 304. The seed tab 120 has a second portion having a tapered width adjacent the second end 210. That is, in the orientation shown in FIG. 3, the body of the seed tab 120 is bounded by angled planes 306, which may intersect at any selected angle. For example, the angle formed by the angled planes 306 may be approximately equivalent to the angle formed by the furrow opener 108 (FIG. 1), and thus, the sides of the seed tab 120 may be flat against the sides of the furrow when the seeder row unit 100 is used in a planting operation.

FIG. 3 also depicts that a maximum width of the tapered second portion may be greater than the constant width of the first portion. The wider part of the tapered second portion may be in the form of a "step" outward when viewed from the top of the seed tab 120 toward the bottom. In particular, a notch 308 or cutout may be present, and the portion of the seed tab 120 above the notch 308 may be narrower than the portion of the seed tab 120 immediately below the notch 308. The notch 308 may enable the seed tab 120 to extend laterally past the vane 124, which is typically on one side of the seed boot 118 or the other. The extended (wider) portion of the seed tab 120, which is also concave as depicted in FIG. 4, may be configured to limit or prevent seeds leaving the seed boot 118 from bouncing laterally outward, and instead directs the seeds downward toward the bottom of the furrow. If the notch 308 is on one side only, as depicted in FIG. 3, the seed tab 120 is asymmetrical.

The curved surface 214 may be defined mathematically as a saddle surface, or a surface having a saddle point. That is, the curved surface 214 curves upward in one direction at a certain point, and downward in another direction. For example, as shown in FIG. 4, the curved surface 214 at the saddle point 408 curves downward left and right in the plane of view, and upward in and out of the plane of view (i.e., toward and away from the viewer). Note that the location of the saddle point 408 may vary based on which direction is defined as "up." Nonetheless, the curved surface 214 has curvature in opposite directions at the same point. The different curvature tends to direct seeds toward the center of the seed tab 120 and along the length of the seed tab 120, toward the bottom of the furrow.

When the seed tab 120 is secured to the seed boot 118, the shape of the interior of the seed boot 118 may have a smooth transition to the shape of the underside of the seed tab 120, and the seed tab 120 may match the curvature of the seed boot 118. In other words, the seed tab 120 may have the same shape as a portion of a hypothetical smooth extension of the seed boot 118. Thus, the radius of curvature 406 of the seed tab 120 may be approximately the same as the radius of curvature of the seed boot 118 at the point of connection of the seed tab 120 to the seed boot 118. Dashed line 222 in FIG. 2 traces the lower extent of the interior surface of the seed boot 118 and the upper extent of the curved surface 214 of the seed tab 120. If these surfaces are aligned and have approximately the same curvature, seeds traveling outward from the seed boot 118 may have a relatively lower chance of bouncing out of the furrow before being directed downward by the seed tab 120. The curved surface 214 may be discontinuous (e.g., offset) from the generally planar surface 212 used to secure the seed tab 120 (as shown by the dashed line 220 above the dashed line 222) to position the curved surface 214 in line with the interior surface of the seed boot 118. This discontinuity or "step down" may enable the seed tab 120 to match the curvature of the interior of the seed boot 118 more closely than a conventional seed tab that lacks the discontinuity.

Figure 5:
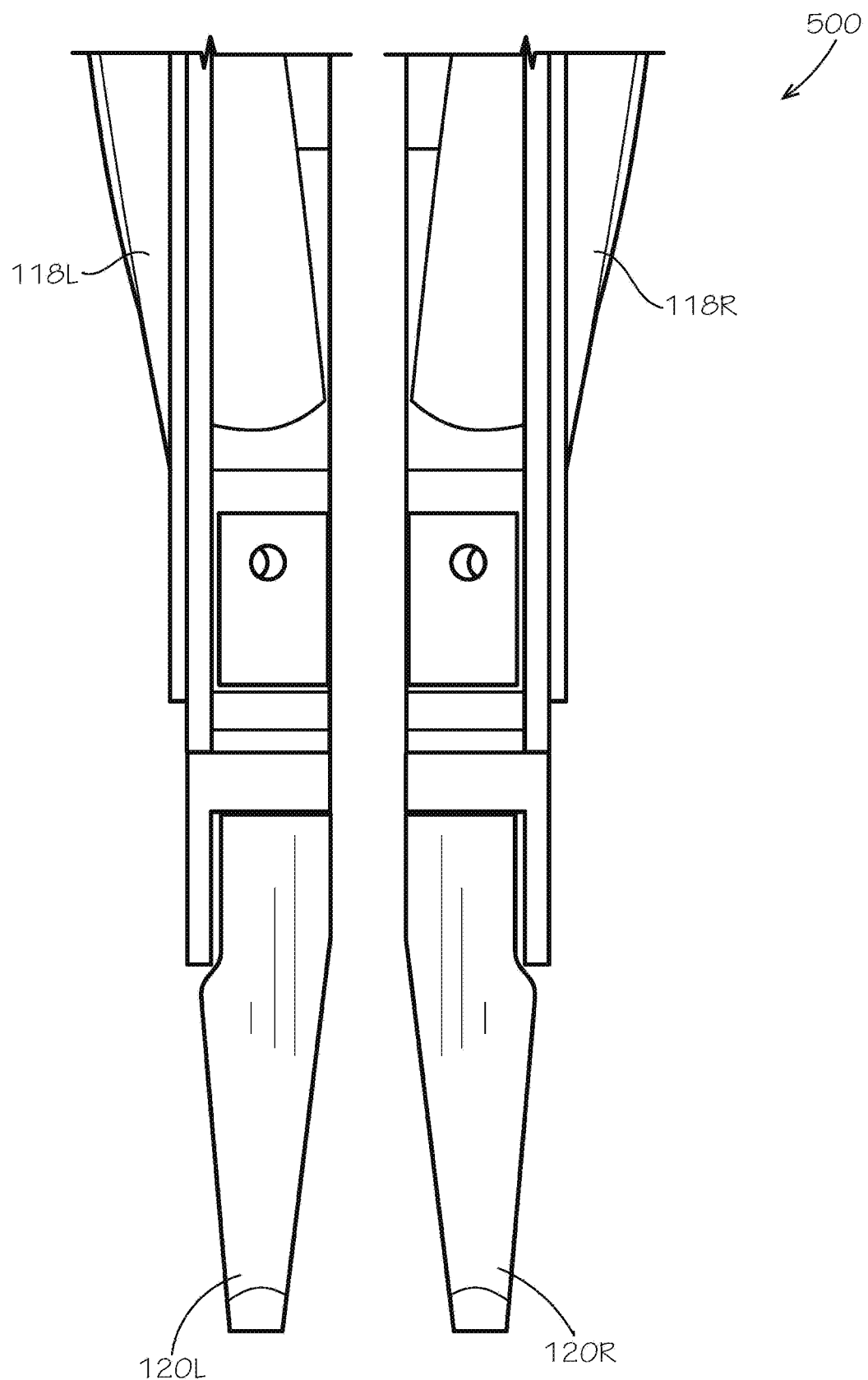
FIG. 5 illustrates two seed-delivery mechanisms and two seed tabs adjacent one another in a mirror-image configuration.

An effect of the shape of the seed tab 120 shown in FIG. 2 through FIG. 4 is that the seed tab 120 is asymmetrical and not reversible. Thus, planters that have seed meters with different seed boots 118, typically a "left" and "right" orientation indicated as seed boot 118L and seed boot 118R in FIG. 5, may require different seed tabs 120L and 120R, with seed tab 120L being a mirror image of seed tab 120R. Though having two different, non-interchangeable parts is less desirable from a maintenance perspective (e.g., manufacturing and stocking additional parts), the improvement in performance of the seed tabs 120 may warrant the complication.

Another effect of the shape of the seed tab 120 shown is that the curved surface 214 of the seed tab 120 pushes seeds downward earlier than conventional straight seed tabs because the open volume between the bottom of the seed tab 120 and the furrow is smaller than for a conventional straight seed tab. A smaller radius of curvature 218 may decrease the open volume. Typically, the radius of curvature 218 may be from about 4 inches (10.16 cm) to about 18 inches (45.72 cm), such as from about 6 inches (15.24 cm) to about 9 inches (22.86 cm). The radius of curvature 406 may be smaller than the radius of curvature 218. For example, the radius of curvature 406 may from about 1 inch (2.54 cm) to about 6 inches (15.24 cm).

Another effect of the shape of the seed tab 120 shown is that the seed tab 120 is relatively less likely to catch or snag on debris in the furrow because the angle of the second end 210 of the seed tab 120 is closer to horizontal than the angle of a conventional straight seed tab.

The seed tab 120 may be formed of a single material or of multiple materials. For example, the portion of the seed tab 120 near the first end 208 may be a flexible material (e.g., a polymer) to enable the seed tab 120 to flex to the shape of the furrow and glide over rocks or other objects. The portion of the seed tab 120 near the second end 210 may include a wear-resistant material (e.g., a metal) to enable the seed tab 120 to have a long useful life. Thus, the seed tab 120 having at least two materials may have beneficial properties from both materials.

The seed tabs disclosed herein may benefit a farmer by helping to control the consistency of seed depth during planting. More consistent seed depth can lead to better crop growth because, for example, early-emerging plants are less likely to shade later-emerging plants. More consistent seed depth may therefore translate into higher crop yield and better return-on-investment for the farmer.

Additional non-limiting example embodiments of the disclosure are described below.

Embodiment 1: A seed tab for a planter comprising an elongate body configured for attachment to a seed boot of a seed meter. The elongate body comprises a curved surface defining a first arc having an axis of curvature in a first direction. The curved surface exhibits a concave cross-section defining a second arc having an axis of curvature in a second direction generally perpendicular to the first direction. The elongate body has a first portion having an approximately constant width adjacent the first end. The elongate body has a second portion having a tapered width adjacent the second end. A maximum width of the second portion is greater than the constant width of the first portion.

Embodiment 2: The seed tab of Embodiment 1, wherein the first portion of the elongate body comprises a first material and the second portion of the elongate body comprises a second material different from the first material.

Embodiment 3: The seed tab of Embodiment 2, wherein the second material exhibits a higher wear resistance than the first material.

Embodiment 4: The seed tab of any one of Embodiment 1 through Embodiment 3, wherein the curved surface exhibits a saddle point.

Embodiment 5: The seed tab of any one of Embodiment 1 through Embodiment 4, wherein the first end comprises a generally planar surface.

Embodiment 6: The seed tab of Embodiment 5, wherein the generally planar surface is discontinuous from the curved surface.

Embodiment 7: The seed tab of Embodiment 5 or Embodiment 6, wherein the generally planar surface is offset from the curved surface.

Embodiment 8: The seed tab of any one of Embodiment 5 through Embodiment 7, wherein a hole is defined through the generally planar surface.

Embodiment 9: The seed tab of any one of Embodiment 1 through Embodiment 8, wherein the axis of curvature of the first arc is between about 6 inches (15.24 cm) and about 9 inches (22.86 cm).

Embodiment 10: The seed tab of any one of Embodiment 1 through Embodiment 9, wherein the axis of curvature of the second arc is between about 1 inch (2.54 cm) and about 6 inches (15.24 cm).

Embodiment 11: The seed tab of any one of Embodiment 1 through Embodiment 10, wherein the elongate body is asymmetrical.

Embodiment 12: A seeding machine, comprising a frame, a first seeder row unit coupled to the frame, and a second seeder row unit coupled to the frame. The first seeder row unit comprises a first furrow opener, a first seed boot configured to deliver seed from the first seeder row unit to a first furrow formed by the first furrow opener, and a first seed tab comprising a first elongate body configured for attachment to the first seed boot. The second seeder row unit comprises a second furrow opener, a second seed boot configured to deliver seed from the second seeder row unit to a second furrow formed by the second furrow opener, and a second seed tab comprising a second elongate body configured for attachment to the second seed boot. The first and second elongate bodies each comprise a curved surface defining a first arc having an axis of curvature in a first direction and a concave cross-section defining a second arc having an axis of curvature in a second direction generally perpendicular to the first direction. The first elongate body is a mirror image of the second elongate body.

Embodiment 13: The seeding machine of Embodiment 12, wherein the first elongate body and the second elongate body each have a first portion having an approximately constant width adjacent first ends thereof and a second portion having a tapered width adjacent a second end thereof, wherein a maximum width of the second portion is greater than the constant width of the first portion.

Embodiment 14: The seeding machine of Embodiment 13, wherein the first portion of each elongate body comprises a first material and the second portion of the elongate body comprises a second material different from the first material.

Embodiment 15: The seeding machine of Embodiment 14, wherein the second material exhibits a higher wear resistance than the first material.

Embodiment 16: The seeding machine of any one of Embodiment 12 through Embodiment 15, wherein the curved surfaces each exhibit a saddle point.

Embodiment 17: The seeding machine of any one of Embodiment 12 through Embodiment 16, wherein each elongate body comprises a generally planar surface.

Embodiment 18: The seeding machine of Embodiment 17, wherein the generally planar surface is discontinuous from the curved surface.

Embodiment 19: The seeding machine of Embodiment 17 or Embodiment 18, wherein the generally planar surface is offset from the curved surface.

Embodiment 20: The seeding machine of any one of Embodiment 17 through Embodiment 19, wherein a hole is defined through each generally planar surface, and wherein each seed tab is secured to a corresponding seed boot by a fastener extending through the hole.

Embodiment 21: The seeding machine of any one of Embodiment 12 through Embodiment 20, wherein the axis of curvature of the first arc is between about 6 inches (15.24 cm) and about 9 inches (22.86 cm).

Embodiment 22: The seeding machine of any one of Embodiment 12 through Embodiment 21, wherein each of the first elongate body and the second elongate body is asymmetrical.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventor. Further, embodiments of the disclosure have utility with different and various planter types and configurations.

What is claimed is:

1. A seed tab for a planter, the seed tab comprising: an elongate body configured for attachment to a seed boot of a seed meter, wherein:
    the elongate body comprises a curved surface defining a first arc having an axis of curvature in a first direction;
    the curved surface exhibits a concave cross-section defining a second arc having an axis of curvature in a second direction generally perpendicular to the first direction;
    the elongate body has a first portion having an approximately constant width adjacent a first end;
    the elongate body has a second portion having a tapered width adjacent a second end; and
    a maximum width of the second portion is greater than the constant width of the first portion;
    wherein the first portion of the elongate body comprises a first material and the second portion of the elongate body comprises a second material different from the first material.

2. The seed tab of claim 1, wherein the second material exhibits a higher wear resistance than the first material.

3. The seed tab of claim 1, wherein the curved surface exhibits a saddle point.

4. The seed tab of claim 1, wherein the first end comprises a generally planar surface.

5. The seed tab of claim 4, wherein the generally planar surface is discontinuous from the curved surface.

6. The seed tab of claim 4, wherein the generally planar surface is offset from the curved surface.

7. The seed tab of claim 4, wherein a hole is defined through the generally planar surface.

8. The seed tab of claim 1, wherein the axis of curvature of the first arc is between about 6 inches (15.24 cm) and about 9 inches (22.86 cm).

9. The seed tab of claim 1, wherein the axis of curvature of the second arc is between about 1 inch (2.54 cm) and about 6 inches (15.24 cm).

10. The seed tab of claim 1, wherein the elongate body is asymmetrical.

11. A seeding machine, comprising:
a frame;
a first seeder row unit coupled to the frame, the first seeder row unit comprising:
a first furrow opener;
a first seed boot configured to deliver seed from the first seeder row unit to a first furrow formed by the first furrow opener; and
a first seed tab comprising a first elongate body configured for attachment to the first seed boot; and
a second seeder row unit coupled to the frame, the second seeder row unit comprising:
a second furrow opener;
a second seed boot configured to deliver seed from the second seeder row unit to a second furrow formed by the second furrow opener; and
a second seed tab comprising a second elongate body configured for attachment to the second seed boot;
wherein the first and second elongate bodies each comprise a curved surface defining a first arc having an axis of curvature in a first direction and a concave cross-section defining a second arc having an axis of curvature in a second direction generally perpendicular to the first direction, and wherein the first elongate body is a mirror image of the second elongate body;
wherein the first elongate body and the second elongate body each have a first portion having an approximately constant width adjacent first ends thereof and a second portion having a tapered width adjacent a second end thereof, wherein a maximum width of the second portion is greater than the constant width of the first portion; and
wherein the first portion of each elongate body comprises a first material and the second portion of the elongate body comprises a second material different from the first material.

12. The seeding machine of claim 11, wherein the second material exhibits a higher wear resistance than the first material.

13. The seeding machine of claim 11, wherein the curved surfaces each exhibit a saddle point.

14. The seeding machine of claim 11, wherein each elongate body comprises a generally planar surface.

15. The seeding machine of claim 14, wherein the generally planar surface is discontinuous from the curved surface.

16. The seeding machine of claim 14, wherein the generally planar surface is offset from the curved surface.

17. The seeding machine of claim 14, wherein a hole is defined through each generally planar surface, and wherein each seed tab is secured to a corresponding seed boot by a fastener extending through the hole.

18. The seeding machine of claim 11, wherein the axis of curvature of the first arc is between about 6 inches (15.24 cm) and about 9 inches (22.86 cm).

19. The seeding machine of claim 11, wherein each of the first elongate body and the second elongate body is asymmetrical.

* * * * *